United States Patent [19]
Halajian et al.

[11] 3,864,513
[45] Feb. 4, 1975

[54] COMPUTERIZED POLARIMETRIC TERRAIN MAPPING SYSTEM

[75] Inventors: John D. Halajian, Levittown; Herbert B. Hallock, Huntington, both of N.Y.

[73] Assignee: Grumman Aerospace Corporation, Bethpage, N.Y.

[22] Filed: Sept. 11, 1972

[21] Appl. No.: 287,876

[52] U.S. Cl. ............................................... 178/6.6
[51] Int. Cl. ............................................. H04b 9/00
[58] Field of Search ....... 340/172.5; 178/6.6 A, 6.7, 178/7.2, 7.7, DIG. 20; 250/220 SP, 203 CR, 558, 203 CT

[56] References Cited
UNITED STATES PATENTS

| | | | |
|---|---|---|---|
| 2,798,115 | 7/1957 | Wiens | 178/6.7 R |
| 2,891,108 | 6/1959 | Wiens | 178/6.7 R |
| 3,333,247 | 7/1967 | Hadley et al | 340/172.5 |
| 3,372,615 | 3/1963 | Birnbaum et al | 250/220 SP |
| 3,560,642 | 2/1971 | Schroader et al | 178/DIG. 20 |
| 3,593,284 | 7/1971 | Frank et al | 178/7.7 |
| 3,752,914 | 8/1973 | England et al | 178/6.7 R |

*Primary Examiner*—Harvey E. Springborn
*Attorney, Agent, or Firm*—Morgan, Finnegan, Durham & Pine

[57] ABSTRACT

A system for mapping terrain from an overhead position such as from an aircraft by scanning an array of terrain segments to measure at least two polarization parameters of the light reflected therefrom, together possibly with other parameters to represent spectral components of the reflected light, thereby to derive digital indications thereof for parameter measurement matrices corresponding to each measured parameter. A computer is used to perform a matrix operation to derive at least one additional matrix representing an interrelationship between the measured parameters. The additional matrix is used to derive a map-type display of the terrain in terms of the interrelationship of polarimetric values.

16 Claims, 5 Drawing Figures

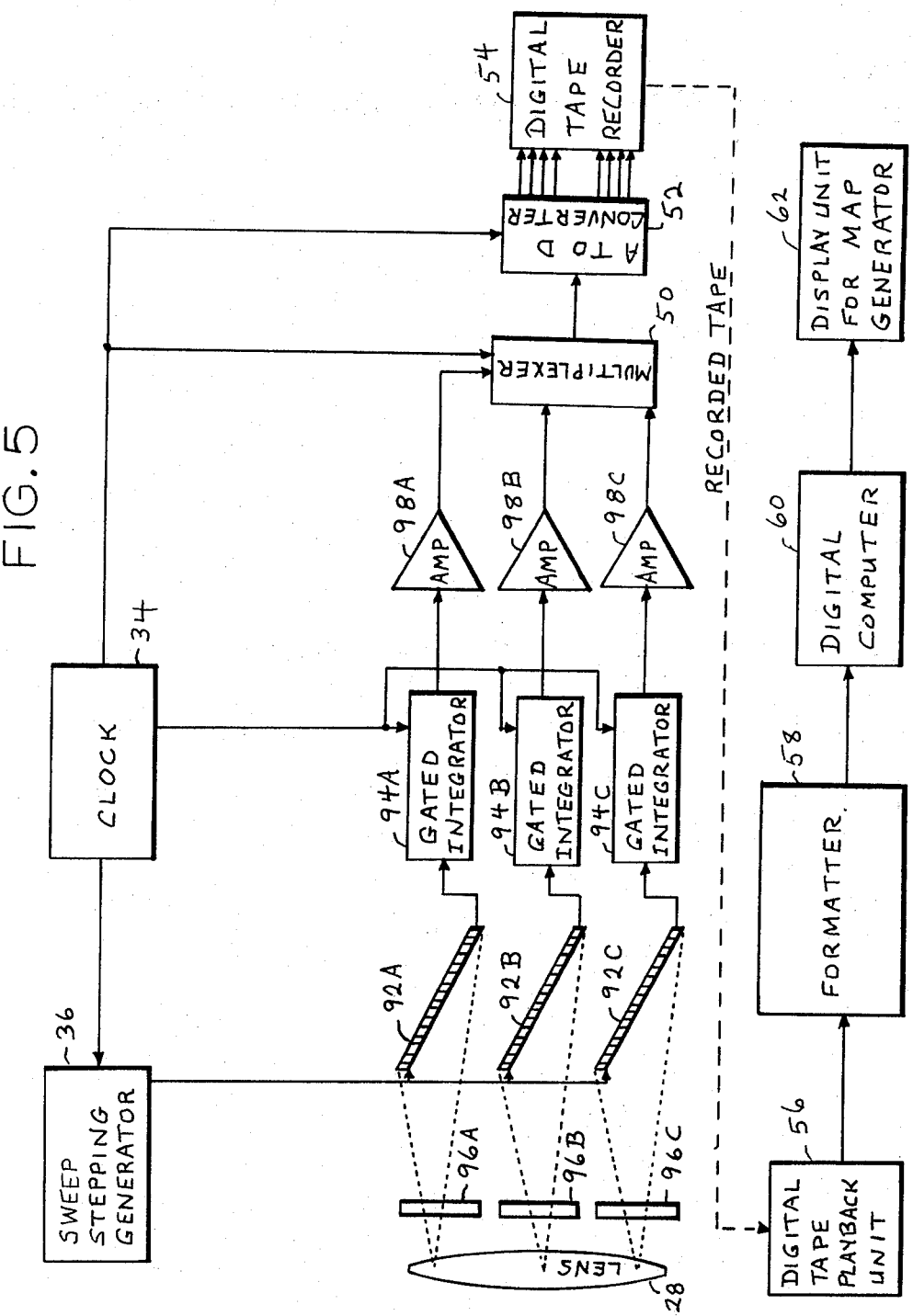

COMPUTERIZED POLARIMETRIC TERRAIN MAPPING SYSTEM

BACKGROUND OF THE INVENTION

1. Field of Invention

This invention relates to a system for automatic mapping of land or water areas by optical scanning of the area and automatic processing of signals thus derived to generate a map in terms of a plurality of parameters of the area.

2. Description of the Prior Art

Prior art systems are capable of mapping an area in terms of two or more spectral component parameters of the light reflected from the area to be mapped. However, there are many types of map data which cannot be obtained without consideration of at least two polarimetric parameters of the light involved.

SUMMARY OF THE INVENTION

The present invention provides for mapping of an area in terms of the interrelationship of a plurality of parameters which are characteristic of the light reflected from the area to be mapped. The parameters considered most useful by the inventors are the intensity of the light having a given direction of polarization and the intensity of the light within a given spectral bandwidth. A terrain area is divided into an array of segments, the segments being arranged in lines for successive scanning, preferably from an aircraft flying over the area on a path perpendicular to the lines of segments. The segments are scanned along the lines at least twice (although the two scannings could be simultaneously by separate elements), and at least two parameters of the reflected light are measured and recorded. The recorded data is used to set up at least two numerical matrices in the shape of the array of segments, respectively representing the image of the array when viewed in terms of each of the two parameters of the reflected light. A computer is then used to operate on the two or more numerical matrices to generate an additional matrix representing the interrelationship between the two or more parameters. This additional matrix is used to generate a map-type display of the array of segments in terms of the interrelationship being considered. The computer can also correct for non-uniformity of response across the scan line by multiplication by a response characteristic matrix. Other mathematical operations, such as dark level subtraction, statistical, or logarithmic analysis, are also possible.

The polarization properties of reflecting surfaces are quite varied and can differentiate objects and backgrounds in a manner analogous to spectral reflectance or color. Because man's intuitive grasp of color and gray tone in pictorial content does not extend to polarization, an invisible but fundamental property of light, little polarimetric mapping has been done. An equally important reason for this failure is a lack of remote sensing instrumentation to pick up and display a polarimetric picture of a whole scene. A polarimetric picture is a gray tone or color-coded rendition of percent-polarization values in the scene. A polarimetric map may be a polarimetric picture of a terrain area, or, the picture elements may be represented by numbers or by contour intervals.

Laboratory optical polarimeters are based upon the use of a rotating polarization analyzer. Use of this type of polarimeter from an aircraft limits the measurements to a narrow strip along the flight path and does not provide an operational map or picture. In order to generate a picture, one can reason by analogy to color photography, or multispectral scanning, that it is not necessary to accomplish a complete polarimetric analysis of each elemental area, but rather to sample discrete key orientations, just as one avoids taking a complete spectrometer reading for spectral data.

Examination of the physics of the scattering of light and of polarization models shows that sampling may well be confined to two orthogonal orientations to obtain s and p component values relative to a scattering plane. Solar radiation incidence, viewing geometry and localized terrain slopes are factors in interpretation based upon the physical models. However, it appears that either Stokes' parameter or percent polarization values in two carefully chosen, mutually perpendicular, orientations would provide the most information for the minimum effort. Since polarization is essentially measured by a ratio, it is necessary to operate by computer on at least two values obtained from each elemental resolution area.

The present invention uses an all-electronic scanning approach based upon configurations of focal plane sensors such as television camera tubes or solid-state arrays, preferably using one common optical objective. While the solid-state array disclosed herein has worthwhile features, the presently most fully developed embodiment uses a television camera tube with a photoemissive response which is linear with light level and whose response resembles that of a bank of multiplier phototubes. Such a system is used from which a number of simultaneous channels may be read out in real time. The sweep control and the photometric output are, in the preferred embodiment, digitized for complete computer compatibility.

Digitization of the sweep as well as the photometric output to at least a ten-bit level is preferred and makes a resulting tape-recorded output completely computer-compatible. Computer reduction of the data can generate spectro-polarimetric maps from two or more sequential or simultaneous scans of the same area of observation. A combination of spectral bandpass and polarization filters can be used. Polarization is measured by using different orientations of a polarization analyzer for different scans of the same terrain area.

These polarimetric maps have utilitarian value in the mapping of turbidity in polluted waters and the depth of shallow coastal waters. Other maps are useful for soil surface moisture mapping, air pollution (turbidity) mapping, agricultural surveys, wetlands demarcation, water surface roughness analysis and oil slick monitoring.

BRIEF DESCRIPTION OF THE DRAWINGS

FIG. 5 is a schematic block diagram of an embodiment of the invention using a solid state sensing array.

DESCRIPTION OF THE PREFERRED EMBODIMENT

Figure 1:
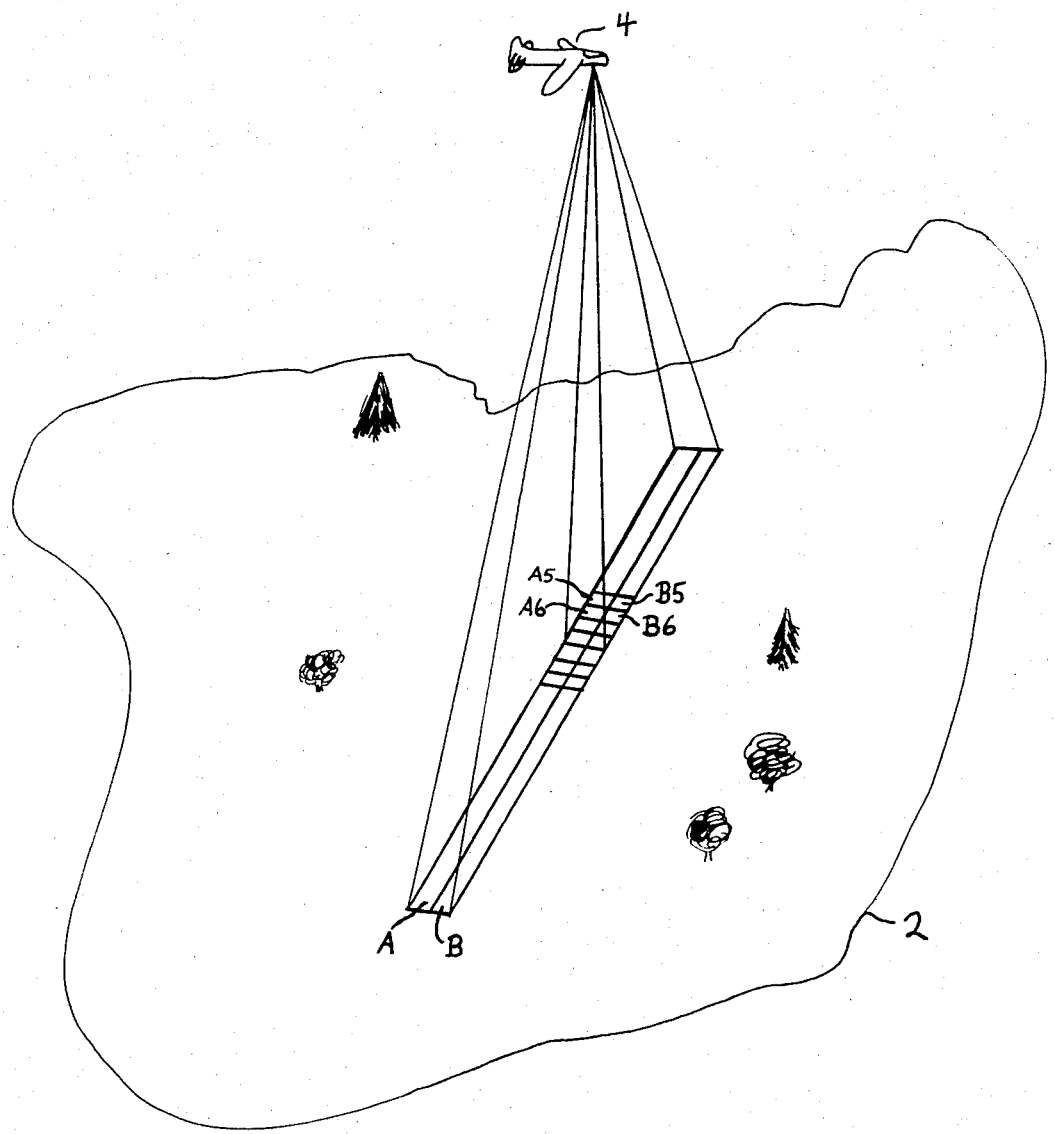
FIG. 1 is a perspective view of an area of terrain being mapped from an aircraft.

FIG. 1 is a perspective view of an area of terrain 2 being mapped from an overhead position, in this case from an airplane 4. The term "terrain" is intended to include land, water, or remote bodies of the solar system. As the plane 4 flies over the terrain, it preferably passes generally perpendicular to a plurality of scan lines A and B extending up to typically 15° to each side of a scan center. Scan lines A and B are located adjacent to each other and are only two of a large number of such lines in succession. Each of the lines is divided into a plurality of line segments such as A5, A6, etc. The function of these scan lines and segments is explained below.

Figure 2:
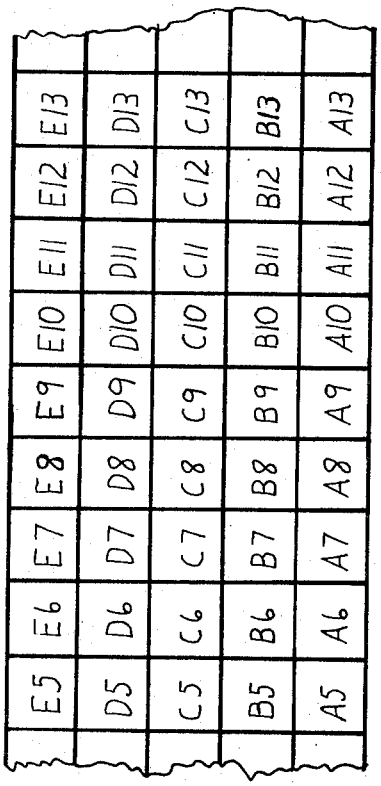
FIG. 2 is a diagram of an area of terrain divided into an array of segments.

FIG. 2 is a diagram of an area of the terrain, divided into an array of segments. Five lines A through E are illustrated, but the array can have an intermediate number of lines. Each line is illustrated with a number of segments. For example, line A includes segments A5 through A13. However, each line can have an indeterminate number of segments.

Figure 3:
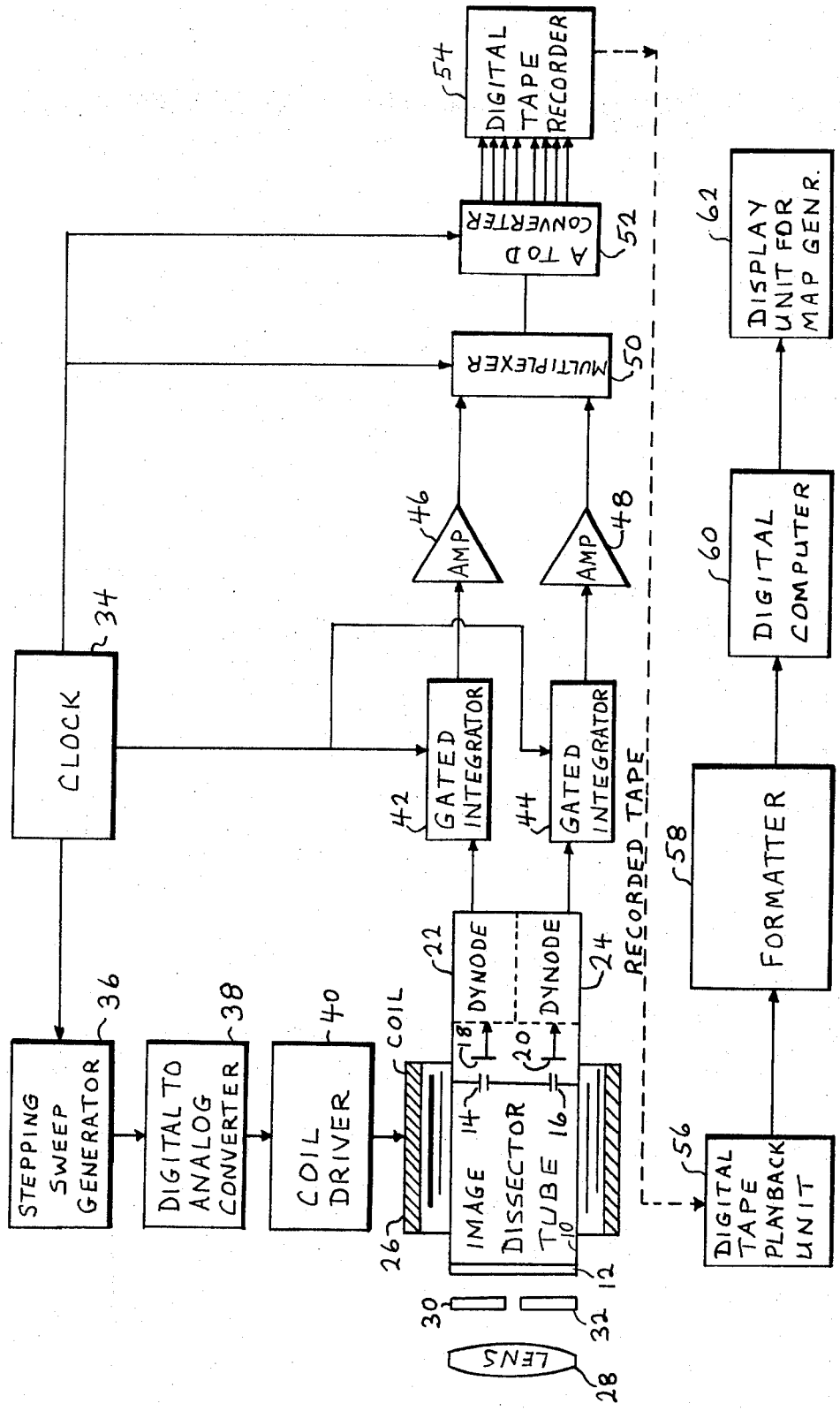
FIG. 3 is a schematic block diagram of a preferred embodiment of the invention.

FIG. 3 is a schematic block diagram of one embodiment of the invention. An image dissector tube 10, constructed in a well-known and commercially available fashion, e.g., ITT Model No. F4502, available commercially from ITT at the time of filing the present application, includes a photoemissive cathode image plate arrangement 12, a minimum of two scanning apertures 14 and 16, two or more anode-associated sensor means 18 and 20 for deriving sensor signals respectively from apertures 14 and 16 for application to dynode amplifiers 22 and 24, and a coil 26, e.g., ITT Model No. F4531, or Washburn Laboratory, Inc., Model No. YF 2301, both available commercially at the time of filing the present application, for causing scanning of the image by the apertures. A lens 28 focuses an image of the terrain on the image plate 12 partially through a filter 30 and partially through a filter 32. The filters may be polarization analyzers for emphasizing light polarized in a predetermined direction or they may be spectral filters for emphasizing light falling within a particular spectral band, or they may be a combination of these types. Light from one filter strikes the image plate in one area and light from the other filter strikes the image plate in another area. The scanning by coil 26 is arranged so that apertures 14 and 16 respectively always receive electrons from a portion of the image plate controlled by filter 30 and 32. Such scanning causes the two apertures to scan two adjacent lines of the array of segments.

A clock 34, e.g., a Monilogic Q 50 RC Clock Generator available commercially from Monitor Systems, Inc., at the time of filing the present application, is provided for controlling the scan rate and other functions of the device. Preferably, the rate of this clock is manually or automatically related to the speed of airplane 4. Clock 34 drives a stepping sweep generator 36, e.g., Reticon Model No. RC 400, available commercially from Reticon Corp. at the time of filing the present application, to produce a digital scan function having a one-step increment for each clock pulse. Thee digital scan function is converted by a digital-to-analog converter 38, e.g., Model No. DAC 10$_{IC}$, IC, available commercially from Pastoriza Electronics, Inc., at the time of filing the present application, into a stairstep scan wave for amplification by a coil driver 40, e.g., Deflection Amplifier Model No. ADO 220, Focus Current Regulator Model No. IRO 140, and High Voltage Power Supply Model No. VH 200, all available commercially from Washburn Laboratory, Inc., at the time of filing the present application, and application as a coil drive signal to coil 26.

Dynodes 22 and 24, or equivalent low-noise amplifying devices, amplify the signals from anode-associated sensor elements and apply resulting amplified sensor signals respectively to gated integrators 42 and 44, e.g., Ortec Model No. 439 Digital Current Integrator, available commercially from Ortec, Inc., at the time of filing the present application. These gated integrators are controlled by clock 34 to integrate and hold the amplified sensor signals over the full step or pause interval of the sweep, thereby making most efficient use of the available signal in each segment and reducing the relative noise component. The integrator output signals are respectively amplified in amplifiers 46 and 48, e.g., Ithaco Low Noise (FET) Preamplifier Model No. 168, Integrated Circuit Amplifier Model No. UC 4,000, and Siliconix Model DG 164A (switching clamp), all available commercially from Ithaco, Inc., Union Carbide, and Siliconix, Inc., respectively, at the time of filing the present application, and multiplexed by a clock-controlled multiplexer 50, e.g., Multiplexer Model No. Moses 8, available commercially from Analog Devices at the time of filing the present application, into an analog-to-digital converter 52, e.g., Pastoriza Model No. ADC −10$_{IC}$ and Model SHA-1 (sample and hold amplifier), available commercially from Pastoriza Electronics, Inc., at the time of filing the present application. Converter 52 converts the time-multiplexed sensor signal into a plurality of digital numerical indications of the parameter values characteristic of the response in each segment indicated for the two adjacent scan lines.

A digital tape recorder 54 or other digital signal recorder is provided aboard airplane 4 for recording the digital numerical indications thus obtained. Alternatively, the data obtained could be provided to an onboard computer. The recorded tape thus obtained in the preferred mode is played back on the ground by a playback unit 56. The recorder 54 and playback unit 56 may be, e.g., Ampex Model No. AR 200, available commercially from Ampex, Inc., at the time of filing the present application. The output from the playback unit 56 is applied to a formatter 58, e.g., Formatter Model No. 4-621, available commercially from Systems Engineering Laboratories, Inc., at the time of filing the present application, for arrangement in appropriate form for application to a digital computer.

The formatter may arrange the data in a fashion for application as a pair of input matrices, each representing the array of segments when viewed in reflected light having one parameter or characteristic emphasized. For example, assume that filter 30 is a vertically polarized analyzer and filter 32 is a horizontally polarized analyzer. In this case, the matrix of values indicating the appearance of the array of terrain segments in vertically polarized light is designated |V| and the matrix of values indicating the appearance of the array of terrain segments in horizontally polarized light in designated |H|. In a computing algorithm for deriving a polarized image matrix |D|, the computer performs a computation on each terrain segment by well-known programming modes to derive an interrelationship |D|, = $(|H| - |V|)/(|H| + |V|)$. Many other algorithms are also possible, depending upon the matrix relationship to be calculated.

The matrix $|D|$ is then used to control the production of a map produced by a display unit 62, e.g., Gould Printer Model 4,800, commercially from Gould, Inc., at the time of filing the present application. Display 62 can merely print out a matrix of values, or it can provide a color-coded or contour-indicating output, or operate with other prior art display methods.

Figure 4:
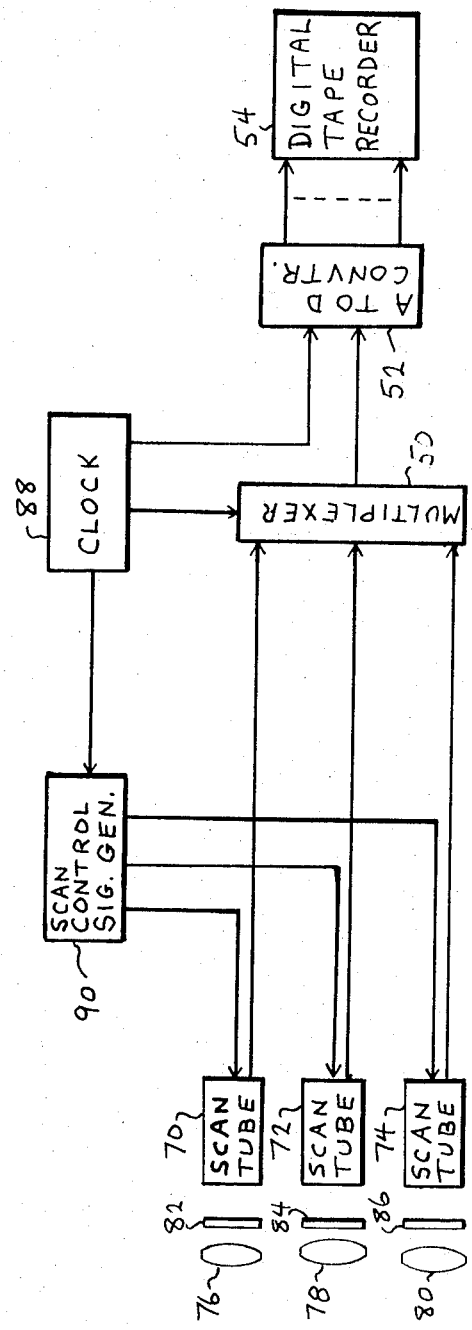
FIG. 4 is a schematic block diagram of an alternative embodiment of the invention.

FIG. 4 is an alternative embodiment of the invention in which three (or more, if desired) image type photosurfaces, such as scan tubes 70, 72, and 74, are provided with separate lenses 76, 78, and 80 for focusing upon the array of segments. Three filters 82, 84, and 86 are provided to allow each tube to simultaneously scan the same line of segments with different parameters emphasized. A clock 88 controls a scan control signal generator in much the same fashion as in the embodiment of FIG. 3. The remaining elements are numbered the same as elements of similar function in the embodiment of FIG. 3.

FIG. 5 is a schematic block diagram of another embodiment of the invention. Elements with the same numbers correspond in structure and function with their respective counterparts in FIG. 3. Sources for these components have been previously described with reference to FIG. 3 and will not be repeated. In this embodiment, the scanning is done by a plurality self-scanned linear arrays 92A, 92B and 92C of solid state detectors. These solid state detector arrays (92A, 92B, and 92C) may be, e.g., Solid State Liner Scanner Model No. 512B, available commercially from Reticon Corp. at the time of filing the present application. These arrays include shift registers and photosensitive elements and require only a train of clock pulses to step them through their various sensing positions. They are commercially available from Fairchild Camera. The output of the arrays are provided respectively to gated integrators 94A, 94B and 94C, which function as do elements 42 and 44 in FIG. 3. Filters 96A, 96B and 96C, which may be polarimetric or spectral as required, adjust the input from lens 28 to the respective arrays.

It should be noted that, as a practical matter, electrical scanning of some sort should be used when making polarimetric measurements, as mechanical scanning tends to distort the polarization direction values.

What is claimed is:

1. A system for mapping an array of terrain segments in order to display a map indicating the interrelationship between at least two polarimetric components of the natural light reflected from each segment comprising:
   A. means for scanning the array to generate and store simultaneously a first and a second matrix of digital values corresponding to a first and a second polarimetric component value of the light reflected from segments of the array corresponding to respective values in the matrices,
   B. computer means for performing a matrix operation with values from the first and the second matrix to derive values for a third matrix indicating said interrelationship, and
   C. display means for displaying the values of the third matrix as said map.

2. A system according to claim 1, wherein said polarimetric components represent the direction of polarization of the reflected light.

3. A system according to claim 1, wherein at least one additional matrix of digital values is simultaneously derived by measurement to represent the spectral wavelength band within which the reflected light falls.

4. A system for mapping terrain in terms of a plurality of characteristics of the light reflected from each of an array of segments of the terrain while under solar illumination, including at least two polarimetric characteristics comprising:
   A. scanning means for causing simultaneous stepwise scanning of a first line of segments in the array and of a second adjacent line of segments parallel to the first line,
   B. first characteristic determining means operative during the simultaneous stepwise scanning of the first and second lines for measuring the light with a first polarimetric characteristic reflected from each respective segment in the first line and for deriving digital numerical indications representative thereof,
   C. second characteristic determining means operative during the simultaneous stepwise scanning of the first and second lines for measuring the light with a second polarimetric characteristic reflected from each respective segment in the second line and for deriving numerical indications representative thereof,
   D. scan repeat means for causing said scanning means next to cause simultaneous stepwise scanning of said second line of segments and a third line of segments and for causing the first and second characteristic determining means respectively to derive digital numerical indications of measured reflected light with the first and the second characteristic as respectively reflected from segments in the second and the third lines, said scan repeat means being successively operative to cause first and second characteristic determination of segments respectively in the Nth and (N + 1)th line scanned simultaneously to derive corresponding digital numerical indications,
   E. computer means for mathematically interoperating the digital numerical indications representing the first characteristic for each segment in said array of segments with the digital numerical indications representing the second characteristic for the corresponding segment in the array for providing a resulting array of values indicating the interrelationship of the first and second characteristics for each segment of the array, and
   F. display means for displaying said resulting array as a map.

5. A system according to claim 4 wherein the polarimetric characteristics include the direction of polarization of the reflected light.

6. A system according to claim 4 wherein the polarimetric characteristics include the spectral wavelength band within which the light reflected from each segment falls.

7. A system according to claim 4 wherein said scanning means comprises:
   A. an image dissector tube comprising:
      1. a plurality of scanning apertures, one of the scanning apertures being positioned to scan one line of segments in the array while another of the scanning apertures is positioned to scan an adjacent parallel line of segments, and 2. coil means for causing said plurality of scanning apertures to operate in unison to scan said array of segments in response to a coil driving signal, and B. means responsive to a clock signal for generating a stepping sweep signal as said coil driving signal.

8. A system according to claim 4 wherein said scanning means comprises:

A. a solid-state linear array of photosensitive elements stepped into sensing condition by operation of an associated shift register under control of a stepping sweep signal, and B. means responsive to a clock signal for generating the stepping sweep signal.

9. A system according to claim 4 further comprising:

A. means responsive to all of the digital numerical indications for making a digital record thereof on recording tape, and B. means responsive to the digital record for providing corresponding digital numerical indications to the computer means.

10. A system for mapping an array of terrain segments in order to display a map indicating the interrelationship between at least two polarimetric parameters of the natural light reflected from each segment while under solar illumination, comprising:

A. an image dissector tube comprising first and second apertures associated with an anode, and a cathode arrangement for receiving an image, B. lens means for focussing an image of a portion of the array of terrain segments onto the cathode arrangement, C. first and second polarimetric filter means for emphasizing respectively first and second polarization direction parameters of the light being focussed as said image, the first filter affecting a first portion of the cathode arrangement and the second filter affecting a second portion of the cathode arrangement, the first and second portions of the cathode arrangement being located to respectively control the first and second aperture areas of the anode, D. coil means responsive to a coil drive signal and associated with the image dissector tube for causing the first and second apertures too simultaneously and respectively scan two parallel adjacent lines off segments from the array of terrain segments, one of the two lines being focused as part of the image on the first portion of the cathode arrangement and another of the two lines being focused on the second portion of the cathode arrangement, E. stepped sweep generator means responsive to a clock signal for generating said coil drive signal as a stairstep sweep, thereby causing the scanning to step to a segment, pause there for an interval, then step on, F. first and second sensing means associated with the anode for deriving first and second sensor signals respectively representative of the magnitude of the emphasized parameter of each segment in the one and the other of the two lines of segments, G. first and second gated integrator means gated in response to the clock signal for respectively integrating and holding the first and second sensor signals over the pause interval, thereby producing first and second integrator output signals having an improved signal-to-noise ratio, H. multiplexer means responsive to the first and second integrator output signals and controlled by the clock signal for generating a time-multiplexed sensor signal, I. analog-to-digital converter means for converting the time-multiplexed sensor signal into a plurality of digital numerical indications of the parameter values of the two adjacent lines, J. tape recording means for recording the digital numerical indications thus obtained, K. means for causing the scanning and other functions to repeat to derive a train of new sets of digital numerical indications corresponding to lines thus scanned, while being synchronized to cause the lines thus scanned to be advanced one line at a time, thereby causing the lines to overlap by one line for each repeat scan from the previous scan, and thereby generating additional sets of digital numerical indications for recording, L. means for playing back the recorded digital numerical indications to provide a playback signal, M. formatter means responsive to the playback signal for arranging the digital numerical indications in a manner suited to treatment as a first and a second matrix of values corresponding respectively to the magnitudes of the first and second parameters in the light reflected from segments of the array corresponding to positions in the first and the second matrix, N. computer means for performing matrix operations on the first and the second matrix to derive a third matrix of values representing said interrelationship of parameters, and O. display means responsive to said third matrix for displaying the interrelationship as said map.

11. A system for mapping an array of terrain segments in order to display a map indicating the interrelationship between at least two polarimetric parameters of the natural light reflected from each segment while under solar illumination, comprising:

A. a plurality of solid-state linear arrays of photosensitive detectors connected as a shift register, whereby the detectors are stepped by a train of pulses to receive an image and provide a sequential output representing each detector in turn, B. lens means for focusing an image of a portion of the array of terrain segments onto the respective linear arrays, C. first and second polarimetric filter means for emphasizing respectively first and second polarization direction parameters of the light being focused as said image, the first filter affecting a first linear array and the second filter affecting a second linear array, D. sweep stepping generator means responsive to a clock signal for causing the first and second linear arrays to scan two parallel adjacent lines of segments from the array of terrain segments, one of the two lines being focused as part of the image on the first linear array and another of the two lines being focused on the second linear array, thereby causing the scanning to step to a segment, pause there for an interval, then step on, E. first and second gated integrator means gated in response to the clock signal for respectively integrating and holding over the pause interval a first and second sensor signal respectively from the first and second linear arrays, thereby producing first and second integrator output signals having an improved signal-to-noise ratio, F. multiplexer means responsive to the first and second integrator output signals and controlled by the clock signal for generating a time-multiplexed sensor signal, G. analog-to-digital converter means for converting the time-multiplexed sensor signal into a plurality of digital numerical indications of the parameter values of the two adjacent lines, H. tape recording means for recording the digital numerical indications thus obtained, I. means for causing the scanning and other functions to repeat to derive a train of new sets of digital numerical indications corresponding to lines thus scanned, while being synchronized to cause the lines thus scanned to be advanced one line at a time, thereby causing the lines to overlap by one line for each repeat scan from the previous scan, and thereby generating additional sets of digital numerical indications for recording, J. means for playing back thee recorded digital numerical indications to provide a playback signal, K. formatter means responsive to the playback signal for arranging the digital numerical indications in a manner suited to treatment as a first and a second matrix of values corresponding respectively to the magnitudes of the first and second parameters in the light reflected from segments of the array corresponding to positions in the first and the second matrix, L. computer means for performing matrix operations on the first and the second matrix to derive a third matrix of values representing said interrelationship of parameters, and M. display means responsive to said third matrix for displaying the interrelationship as said map.

12. A method for mapping an array of terrain segments to display a map indicating the interrelationship between at least two polarimetric components of the natural light reflected from each segment including the steps of:

A. scanning the array to generate and store simultaneously a first and a second matrix of digital values corresponding to a first and a second polarimetric component value of the light reflected from segments of the array corresponding to respective values in the matrices;

B. performing a matrix operation with values from the first and the second matrix to derive values for a third matrix indicating said interrelationship; and C. displaying the values of the third matrix as a map.

13. The method according to claim 12, including the step of simultaneously deriving an additional matrix of digital values representing the spectral wavelength band within which the reflected light falls.

14. A method for mapping terrain in terms of a plurality of characteristics of the light reflected from each of an array of segments of the terrain while under solar illumination, including at least two polarimetric characteristics, including the steps of:

A. simultaneously scanning a first line of segments in the array and a second adjacent line of segments parallel to the first line;

B. measuring the light with a first polarimetric characteristic reflected from each respective segment in the first line and deriving digital numerical indications representative thereof;

C. measuring the light with a second polarimetric characteristic reflected from each respective segment in the second line and deriving numerical indications representative thereof;

D. simultaneously scanning said second line of segments and a third line of segments and deriving digital numerical indications of measured reflected light with the first and the second characteristics as respectively reflected from segments in the second and the third lines, and causing first and second characteristic determination of segments respectively in the Nth and (N + 1)th line scanned simultaneously to derive corresponding digital numerical indications;

E. mathematically interoperating the digital numerical indications representing the first characteristic for each segment in the array of segments with the digital numerial indications representing the second characteristic for the corresponding segment in the array for providing a resulting array of values indicating the interrelationship of the first and second characteristics for each segment of the array; and F. displaying the resulting array as a map.

15. A method for mapping an array of terrain segments in order to display a map indicating the interrelationship between at least two polarimetric parameters of the natural light reflected from each segment while under solar illumination, including the steps of:

A. receiving an image;

B. focussing an image of a portion of the array of terrain segments;

C. emphasizing respectively first and second polarization direction parameters of the light being focussed as the image;

D. simultaneously and respectively scanning two parallel adjacent lines of segments from the array of terrain segments, and focussing the two lines as part of the image;

E. generating a drive signal as a stairstep sweep, thereby causing the scanning to step to a segment, pause there for an interval, then step on;

F. deriving first and second sensor signals respectively representative of the magnitude of the emphasized parameter of each segment in the one and the other of the two lines of segments;

G. integrating and holding the first and second sensor signals over the pause interval, thereby producing first and second integrator output signals having an improved signal-to-noise ratio;

H. generating a time-multiplexed sensor signal;

I. converting the time-multiplexed sensor signal into a plurality of digital numerical indications of the parameter values of the two adjacent lines;

J. recording the digital numerical indications thus obtained;

K. deriving a train of new sets of digital numerical indications corresponding to lines thus scanned, while being synchronized to cause the lines thus scanned to be advanced one line at a time, thereby causing the lines to overlap by one line for each repeat scan from the previous scan, and thereby generating additional sets of digital numerical indications for recording;

L. playing back the recorded digital numerical indications to provide a playback signal;

M. arranging the digital numerical indications played back in step L. in a manner suited to treatment as a first and second matrix of values corresponding respectively to the magnitudes of the first and second parameters in the light reflected from segments of the array corresponding to positions in the first and the second matrix;

N. performing matrix operations on the first and the second matrix to derive a third matrix of values representing the interrelationship of parameters; and O. displaying the interrelationship as a map.

16. A method for mapping an array of terrain segments in order to display a map indicating the interrelationship between at least two polarimetric parameters of the natural light reflected from each segment while under solar illumination, including the steps of:

A. receiving an image at a plurality of solid state linear arrays and providing a sequential output from each array in turn;

B. focusing an image of a portion of the array of terrain segments onto the respective linear arrays;

C. emphasizing respectively first and second polarization direction parameters of the light being focused as the image;

D. scanning two parallel adjacent lines of segments from the array of terrain segments, one of the two lines being focused as part of the image on a linear array and another of the two lines being focused on a second linear array, causing the scanning to step to a segment, pause there for an interval, then step on;

E. integrating and holding over the pause interval a first and second sensor signal respectively from the first and second linear arrays, thereby producing first and second integrator output signals having an improved signal-to-noise ratio;

F. generating a time-multiplexed sensor signal;

G. converting the time-multiplexed sensor signal into a plurality of digital numerical indications of the parameter values of the two adjacent lines;

H. recording the digital numerical indications thus obtained;

I. deriving a train of new sets of digital numerical indications corresponding to lines thus scanned, while being synchronized to cause the lines thus scanned to be advanced one line at a time, thereby causing the lines to overlap by one line for each repeat scan from the previous scan, and thereby generating additional sets of digital numerical indications for recording;

J. playing back the recorded digital numerical indications to provide a playback signal;

K. arranging the digital numerical indications played back in step J. in a manner suited to treatment as a first and a second matrix of values corresponding respectively to the magnitudes of the first and second parameters in the light reflected from segments of the array corresponding to positions in the first and the second matrix;

L. performing matrix operations on the first and second matrix to derive a third matrix of values representing the interrelationship of parameters; and M. displaying the interrelationship as a map.

* * * * *